United States Patent [19]

Bouteille et al.

[11] 4,364,414

[45] Dec. 21, 1982

[54] PNEUMATIC PHASE MODULE LOCKING DEVICE

[75] Inventors: Daniel Bouteille, Ville D'Avray; Hugues Marguet, Paris; Eric Petrimaux, Evreux, all of France

[73] Assignee: La Telemecanique Electrique, France

[21] Appl. No.: 172,810

[22] Filed: Jul. 28, 1980

[51] Int. Cl.³ .............................................. G05D 16/04

[52] U.S. Cl. ............................... 137/624.14; 137/269; 137/624.18; 137/884; 137/885

[58] Field of Search ................... 137/269, 624.14, 884, 137/885, 624.18

[56] References Cited

U.S. PATENT DOCUMENTS 4,205,700 6/1980 Bouteille et al. ........... 137/624.14 X 4,245,673 1/1981 Bouteille et al. .................... 137/884

*Primary Examiner*—Gerald A. Michalsky

*Attorney, Agent, or Firm*—William Drucker

[57] ABSTRACT

A locking device, for a pneumatic sequential control phase module, is constituted by an apparatus adapted to be placed between a base and a housing containing a bi-stable memory, and comprises a selector member receiving cancelling signals and auxiliary signals and the output of which is coupled to a locking input of an inhibitor element placed in series with the channel which transmits the control signals for placing the memory in logic state "1".

6 Claims, 8 Drawing Figures

PNEUMATIC PHASE MODULE LOCKING DEVICE

BACKGROUND OF THE INVENTION

The invention relates to a locking device for a pneumatic phase module having for each phase of operation of an automatic sequencing device a bi-stable memory, which is contained in a removable housing having a bearing face provided with first communication orifices and adapted to be applied on a fixing surface of a base having second communication orifices cooperating with the first communication orifices, the memory further having a control input for placing it in logic state "1", a cancelling input for placing it in logic state "0" and an output, the base comprising further, for feeding the orifices, (i) channels capable of cooperating likewise with corresponding channels of identical adjacent bases for conveying the feed pressure, (ii) channels for transmitting control signals to a following base, (iii) channels for sending a cancelling signal to a preceding base, and (iv) channels transmitting general re-set to zero signals, and an AND gate, with two inputs and one output, associated with each memory in such a manner that one of its inputs receives cancelling signals arising from the performance of an operation, and that its other input receives the output signals coming from the memory, the output of the AND gate transmitting a control signal to the control input of the memory of the following phase module of the automatic sequencing device.

THE PRIOR ART

The known locking devices generally consist of an assembly of pneumatic logic gates carrying out an operation the result of which is applied to the external coupling which receives the cancelling signal, this coupling being most often the sole and unique input by which it is possible to inhibit the operation of a particular phase module; this solution presents numerous inconveniences regarding the bulk of the necessary components thereof and the reliability of the installation.

It has also been proposed to use the general re-set to zero which is provided on the sequential chains, but one then loses all trace of the operations carried out previously or in the course of being carried out. Furthermore, it is often useful to provide auxiliary locking inputs which are independent of those used for the cancelling signals. These inputs shall advantageously be apt to be selected in order that one may take into account either one of several locking signals, or all of the locking signals. Finally, it has been envisaged to break the continuity of the association of the phase modules, which are generally secured one against the other, in order to place, upstream of the module needing a particular locking, intermediate derivation elements permitting access to the channels conveying the control orders in order to apply to these latter the stoppings and lockings necessary.

As a sequential control system usually has a linear arrangement, this remedy unfortunately results in a considerable increase of bulk, and makes practically impossible the improvement of a chain established in accordance with the previous concepts by reason of the numerous dismountings which it is then necessary to carry out.

OBJECT OF THE INVENTION

The invention accordingly proposes to provide a locking device capable of being put to use without necessitating a radical transformation of an existing sequential chain, and to bring thereto, at the phase module or modules concerned, a substantial improvement of the reliability of operation, and also an increase of the possibilities of use due to the faculty of putting to work more complex circuit arrangements.

SUMMARY OF THE INVENTION

According to the invention, the result referred to is obtained by reason of the fact that the device comprises, in the module, a pneumatic selector member with one output and two inputs, and a pneumatic inhibitor member having a transfer channel which is provided with a closure controlled by a pressure applied on a locking input pneumatically isolated from the channel, this selector having the output coupled to the locking input, a first input coupled to an internal channel fed by the cancelling signals and a second input joined to a coupling accessible from the exterior in order to receive auxiliary locking signals, a first portion of the transfer channel of this member being coupled to the control input of the memory and a second extremity of the said channel receiving the control signals delivered by a preceding module.

BRIEF DESCRIPTION OF THE DRAWINGS

Other features for conferring on the device particular functional properties or greater ease of placing into operation will appear clearly from the following description with reference to the accompanying drawings wherein.

DESCRIPTION OF THE PRIOR ART

Figure 1:
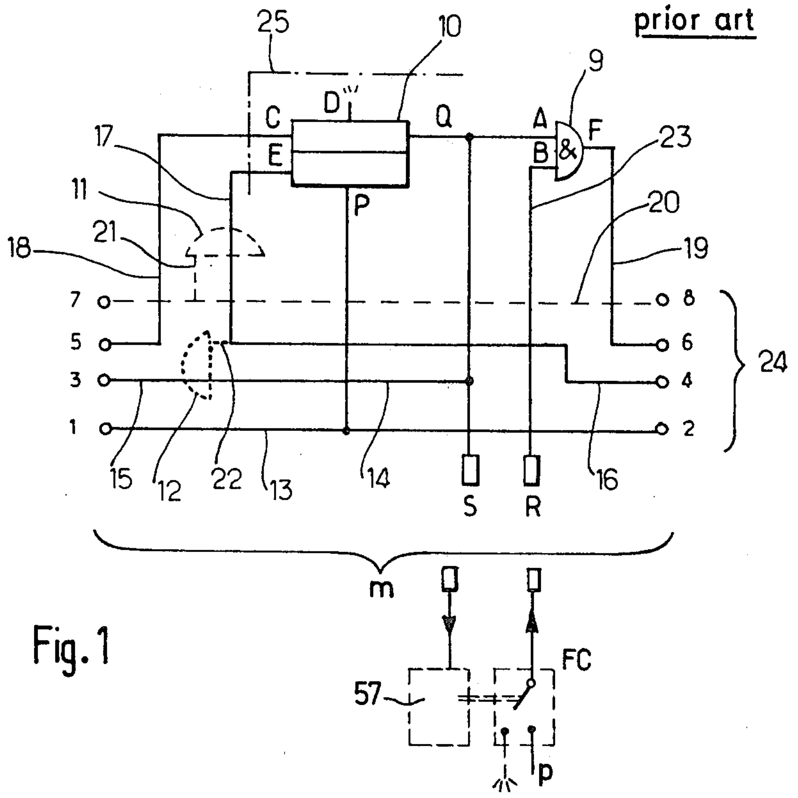
FIG. 1 shows schematically a phase module according to the prior art.

A pneumatic automatic sequencing device makes use of identical components connected in series and currently known under the name "phase module". Each of these phase modules m, such as illustrated in FIG. 1, includes in known manner pneumatic logic elements which can be operated in various ways, but which always have a basic structure such as that illustrated in this figure.

There is to be found in these modules a series of openings such as 1,2 constituting the extremities of a channel 13 conveying the feed pressure, openings such as 3 and 4 constituting the extremities of channels 15 and 16 respectively, one of which transmits cancelling signals to the preceding module and the other of which receives cancelling signals from the following module, and openings such as 5 and 6 constituting the extremities of channels 18 and 19 which respectively receive and transmit control signals coming from the preceding module and going to the following module, respectively.

These control signals are applied to the input C, for placing in logic state "1" of a bi-stable memory 10 (with valve or slide-valve) which also comprises an entry for feed pressure P, an exit Q, a cancelling input E for placing in logic state "0", and additionally a discharge connection D to exhaust.

A pneumatic logic AND gate 9 comprises an output F coupled by a channel 19 to 6, a first input A coupled, by a channel 14, to the exit Q and by channels 15 and 14, to 3 and an external coupling S for joining the module to external apparatus 57, and a second entrance B coupled by a channel 23 to an external coupling R for the coupling of the module to a pneumatic switch such as FC delivering feedback signals p when the corresponding operation has been carried out.

The channel 19 couples the output F of the AND gate to 6, whilst the channel 18 couples the control input C to 5. Re-setting of the memory to logic state "0" which is carried out through the opening 4 and the channels 16 and 17 at each phase of the sequential cycle, generally requires an OR gate permitting also a general re-setting to zero which can be either instantaneous (by reason of the use of the OR gate 11 shown in broken line and coupled by a channel 21 to another channel 20 terminating at the openings 7, 8) or repeated when an OR gate such as 12 shown in dotted lines is coupled by a channel 22 to the channel 16.

The process of re-setting to zero which has been described for the memory does not form part of the invention, and it will be remembered that a module such as has been described is generally constituted by several distinct elements one of which is a removable housing 25 which contains the memory 10, whilst another, or several other, elements which are removable or not receive on a base 24 the openings 1, 2, 3, 4 . . . and the couplings S and R. In the following description, the term "base" will be applied to the whole of the bodies of the module not containing the memory.

It will be considered in the following that the memory is removable and that the rest of the bodies receiving the openings 1, 2, . . . of certain channels and the couplings, constitutes a support or base for the memory, this definition not excluding the case wherein the AND and OR gates mentioned hereinabove are placed in the base, or the case wherein the AND and OR gates are associated with the housing 25.

The applications whereby the control orders terminating at the input C of the memory must be inhibited are relatively frequent; amongst the situations where such a feature is recommended, it is necessary to include that wherein an end-of-stroke switch can be locked in active position and can deliver, as a result, a pressure at R before the arrival of the control signal at C; another situation is that wherein the end-of-stroke switch, associated with R, having been activated by another means, then de-activated, the pressure present at R has not rapidly disappeared, such that the presence of a residual pressure at R, and thus at B, here again causes a phase jump when a control signal arrives at C and thus at A.

The inhibition of the control signals is likewise desirable, or even indispensible, when two distinct movements, controlled simultaneously by a same phase module, cannot take place simultaneously and can consequently deliver cancelling signals which are staggered in time. It has been proposed to feed the coupling R through the outlet of an AND gate external to the module and having two inputs each coupled to an end-of-stroke device, each delivering a cancelling signal upon the accomplishment of the operations with which they are respectively associated.

This arrangement does not permit to distinguish, as in the case hereinabove, whether one of the end-of-stroke switches was abnormally activated or locked, or was in the course of exhausting; furthermore, if in this latter case there was not produced a phase jump as in the preceding cases, one would still not know whether the two movements actually have been accomplished, and yet the sequencer will continue its progression.

The necessity to detect such an abnormal situation and of remedying it consequently requires the observation of the particular state of the two end-of-stroke devices previous to that of the generation of the cancelling signals, and as a consequence, the introduction of a locking signal at a point previous to the controlling of the memory. This necessity had already been recognized, and prior art measures proposed to provide a solution thereto consisting in associating the two cancelling signals, applied to the module concerned, with the return signal of the preceding phase module, which gave rise to complicated external cabling and the use of supplementary external logic components which reduced reliability.

A supplementary locking input associated with the phase module concerned and acting upstream of the memory will consequently permit not only remedying of the inconveniences mentioned above but also to resolve numerous problems of reliability without complicating the circuits.

DESCRIPTION OF THE PREFERRED EMBODIMENT

Figure 2:
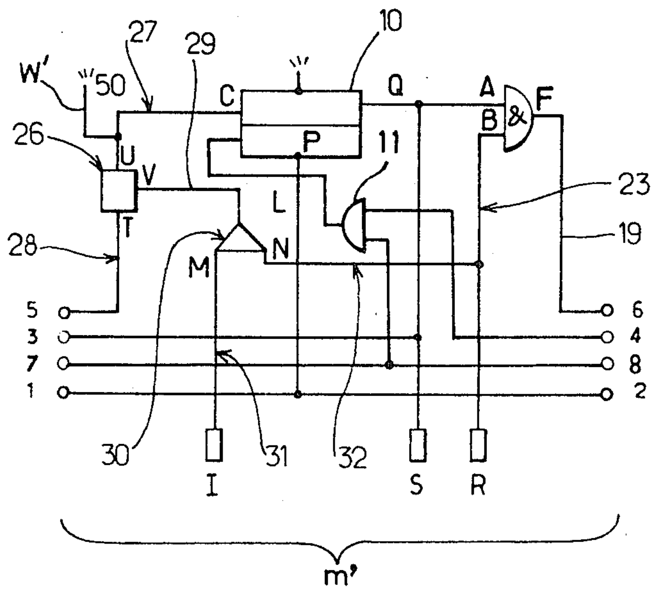
FIG. 2 shows schematically a phase module according to the preferred embodiment of the invention.

FIG. 2 includes with the same references the circuit elements of FIG. 1, to which have been added supplementary elements to improve reliability and to permit enlargement of the possibilities of control of a phase module m'.

On the path of the channel terminating at the control input C there has been placed an inhibitor element 26 which consequently defines an upstream portion of channel 28 coupled to 5 at T, and a downstream portion of channel 27 coupled to C and to U, T being a fluid input, U a fluid output and V a locking input.

This latter is coupled by a channel 29 to an output L of a selector 30 having two distinct fluid feed paths M and N which are respectively coupled the first by a channel 31 with a coupling I of the module, accessible from the exterior to receive auxiliary signals, and the second by a channel 32 to the channel 23 conveying the signals returning from R to B.

Figure 3A:
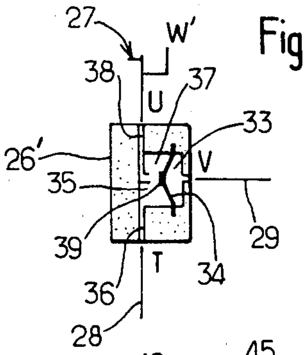
FIGS. 3*a* and 3*b* show first and second embodiments of the pneumatic selector member comprised in the phase module of FIG. 2, FIGS. 4*a* and 4*b* show first and second embodiments of the pneumatic inhibitor member, comprised in the phase module of FIG. 2
Figure 3B:
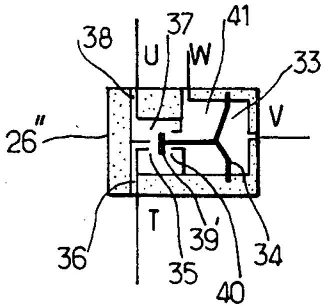

The inhibitor element can for example assume one of the forms 26', 26", illustrated in FIGS. 3*a* and 3*b*, wherein the references U, V, T have the same meaning as in FIG. 2.

In FIG. 3*a*, the input V terminates in a chamber 33 bounded by a deformable membrane 34; the face of this membrane remote from 33 carries a valve 39 which is placed opposite to an orifice 35 placed in series in a transfer channel 36, 37, 38, passing from the input T to the output U.

In FIG. 3*b*, wherein the elements having the same functions have the same references, the membrane 34 is associated with a double valve 39' placed between a first orifice 35 and a second orifice 40 opening into a chamber 41 which is bounded by the face of the membrane remote from 33 and which in turn opens through a discharge orifice W towards exhaust.

In the two embodiments, a pressure applied at the input T of the transfer channel can only produce circulation of fluid towards the output U if there is no locking pressure applied at V, this input being pneumatically isolated from the transfer channel by the membrane.

Figure 4A:
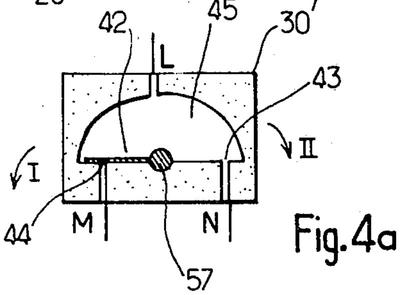
Figure 4B:
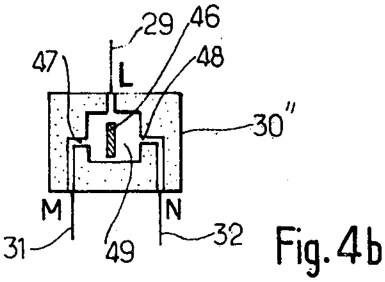

The selector element is illustrated schematically in 30', 30'', FIGS. 4*a* and 4*b* one of these two arrangements will be used, according to the needs of the user.

In FIG. 4*a*, a valve 42, orientable from the exterior of the module M' by the operator, can take up one or other of the two positions I and II, which establish the coupling between the output L opening into the chamber 45 of the valve, and one of the respective inputs M and N, by closing one of the orifices 43 or 44 respectively coupled to N and M, for example by means of an operating member 57; constructions of slide-valve can equally well be used. In FIG. 4*b*, the selector 30'' is an automatic selector having the form of a known pneumatic OR logic gate. A valve 46 is freely movable between two orifices 47, 48 coupled respectively to M and to N, and one of the pressures present at M or N, or the two pressures simultaneously present at M and N, will cause a signal to be transmitted towards the output L which is coupled to the chamber 49 in which the valve is movable.

When an inhibitor member such as 26' is used, it can be advantageous to couple one of the portions of the channel 27, or 38 to a discharge channel W' opening to exhaust through a calibrated orifice 50 permitting a slight escape of air which does not hinder the rise of pressure at C necessary for control of the memory but which will avoid a volume of compressed air remaining in the portion of the channel 27, 38 if small escapes are produced in the memory, or if the appearance of a locking signal V takes place immediately after the appearance of the control signal at C.

Figure 5:
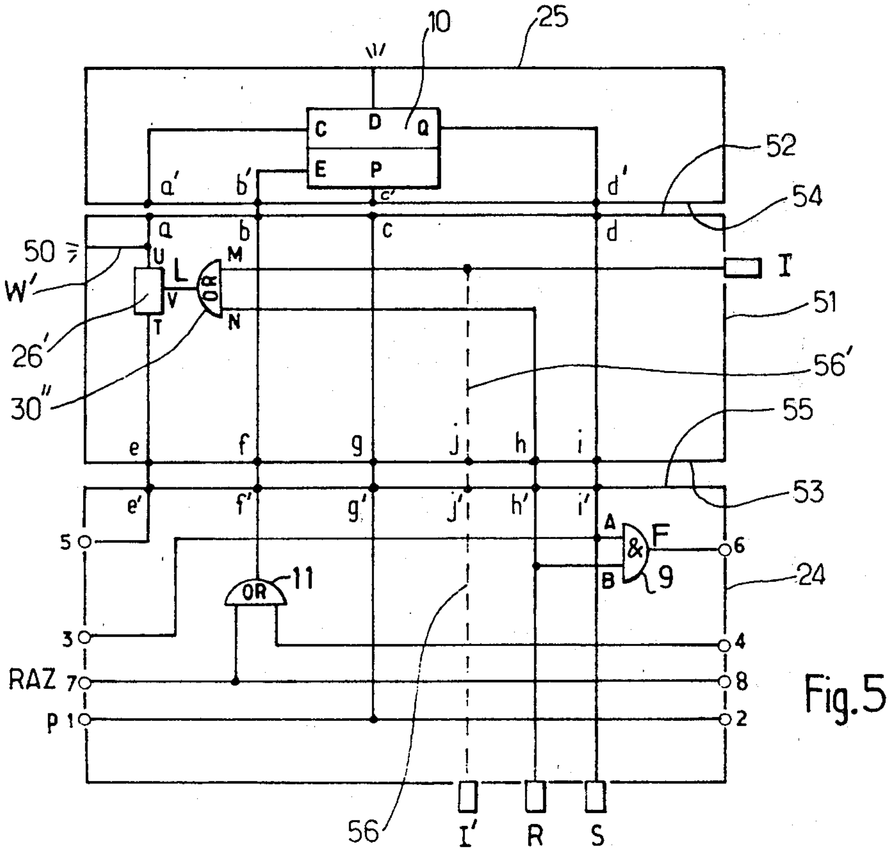
FIG. 5 illustrates more in detail a phase module comprising a housing which contains a memory, a base and a body containing the selector and inhibitor members, and FIG. 6 diagrammatically shows a plurality of cascade-mounted phase modules $m_1$, $m_2$. . . , each of which is conforming to the embodiment of FIG. 2.
Figure 6:
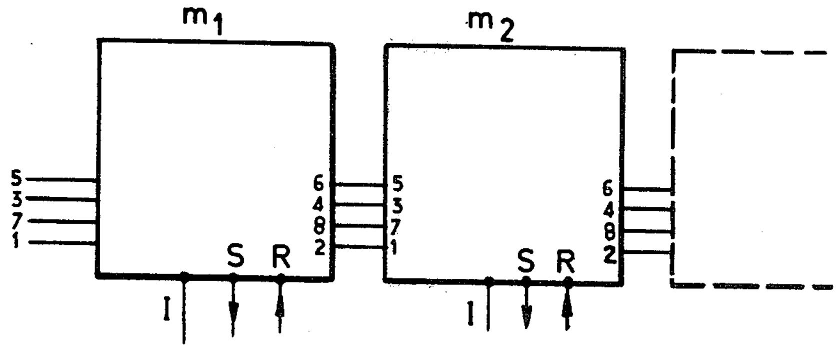

A preferred practical manner of construction of the device, shown in FIG. 5, utilises a body 51 having two opposed parallel faces 52 and 53. At the interior of the body there have been disposed the inhibitor member 26' of FIG. 3*a* and the OR gate 30'', of FIG. 4*b* as well as channels permitting the coupling of these two elements through upper openings a,b,c,d, and respectively lower openings e,f,g,h,i, on the one hand to first orifices a', b', c', d', of the bearing face 54 of the housing 25 containing the memory, and on the other hand to second orifices e', f', g', h',i', of the fixing surface 55 of the base 24, this latter base being the only element cooperating by juxtapositioning with adjacent bases, not shown, of the sequential chain.

Thus, according to the needs and necessities of locking, it is possible either to mount the housing 25 directly on the base 24, or again to place between these latter the body 51 of the device. The external coupling I coupling the input M of the OR gate (or of the manual selector 30', FIG. 4*a*) could be placed either on the body of the device, or again as is shown at I', on the base 24 with the aid of a channel 56' in the device, of a supplementary channel 56 provided in the base, of an opening J on 53 and of an orifice J' on 55; it is obvious that the positioning of the device likewise requires the presence in the body of coupling channels necessary for the transfer of re-set to zero signals, for feeding pressure to the module, for the output of the memory, as well as possibly channels associated with the AND gate 9 and/or with the OR gate 11 or 12 respectively if the whole or part of these latter are placed in the housing 25.

We claim:

1. In a pneumatic circuit for the automatic control of a sequence of programmed operations, said pneumatic circuit comprising a plurality of cascade-mounted phase modules, each of said modules controlling a programmed operation of the sequence and comprising: a bistable pneumatic memory contained in a removable housing having a bearing face provided with first fluid communication orifices; a base having a fixing surface provided with second communication orifices which are adapted to cooperate with the first communication orifices when the said bearing face is applied on said fixing surface, the respective bases of the said cascade-mounted modules being mounted adjacent to each other, said memory having a control input for putting it in logic state "1", a cancelling input for putting it in a logic state "0" and an output for feeding a signal which controls a programmed operation, said base comprising first channels capable of cooperating with the corresponding first channels of adjacent bases of said cascade-monted phase modules to convey a feed pressure to the phase modules, second channels for transmitting control signals to the adjacent base of the following phase module of the pneumatic circuit, fluid channels for sending a cancelling signal to the adjacent base of the preceding phase module of the pneumatic circuit, fourth channels for transmitting general re-set to zero signals to the phase module; each phase module further comprising: an AND gate having first and second inputs and an output, the first input of the AND gate being fed by cancelling signals resulting from the performance of the programmed operation controlled by the said phase module and the second input of the AND gate being fed by the output of the said memory, the output of the AND gate transmitting a control signal to the control input of the memory of the following module; a locking device associated with each of said phase modules and comprising:

(i) a pneumatic selector member having an output and first and second inputs and (ii) a pneumatic inhibitor member having a locking input fed by the output of the pneumatic selector member, and a transfer channel connecting the output of the preceding phase module to the control the input of the said memory, closure means cooperating with said transfer channel and control means, actuated by the fluid pressure, for controlling the said closure means to interrupt the circulation of fluid in the transfer channel at the said locking input, the first input of the pneumatic selector member being fed from the said cancelling signals and the second input being adapted to receive auxiliary cancelling signals.

2. In a pneumatic circuit according to claim 1, said selector member includes a hollow body provided with said output and said first and second inputs, a vane movably mounted within said body, said vane having an operating member which is accessible from outside said body and is movable by means of a manual action for closing either one of said first and second inputs of the selector member.

3. In a pneumatic circuit according to claim 1, said selector member includes a hollow body provided with said output and said first and second inputs, a vane freely movable within said body from a first to a second position according to whether a fluid pressure is present at the first or second input thereof, respectively, the said vane closing the first input in its second position and the second input in its first position.

4. In a pneumatic circuit according to claim 1, the said closure means of said inhibitor member comprises a membrane deformable under the action of a fluid pressure applied at the said locking input, said transfer channel has an orifice adapted to be closed by the movement of said closure means, and a calibrated discharge orifice is provided in that portion of the transfer channel situated between said orifice and the control input of the memory.

5. In a pneumatic circuit according to claim 1, the said locking device is placed in a body having first and second faces which are respectively adapted to be applied on the said bearing surface and on the said fixing surface, said first and second faces respectively having openings adapted to cooperate with said first orifices and second orifices respectively and a channel, connecting the said second input of the pneumatic selector member, through the said body, to coupling means mounted on the outer surface of said body for feeding of the said auxiliary cancelling signals.

6. In a pneumatic circuit according to claim 1, the said locking device is placed in a body having first and second faces which are respectively adapted to be applied on the said bearing surface and on the said fixing surface, said first and second faces respectively having openings adapted to cooperate with the said first and second orifices respectively, a channel, connecting, through said body and said base, the said second input of the pneumatic selector member to coupling means mounted on the outer surface of said base for feeding of the said auxiliary cancelling signals.

* * * * *